US012650633B2

(12) United States Patent
Tang et al.

(10) Patent No.: US 12,650,633 B2
(45) Date of Patent: Jun. 9, 2026

(54) LENS DRIVER AND LENS DRIVER CIRCUIT

(71) Applicant: SHENZHEN LEQI INNOVATION CO., LTD., Shenzhen (CN)

(72) Inventors: Wei Tang, Shenzhen (CN); Zefeng Ma, Shenzhen (CN); Jinxu Lai, Shenzhen (CN)

(73) Assignee: SHENZHEN LEQI INNOVATION CO., LTD., Shenzhen (CN)

( * ) Notice: Subject to any disclaimer, the term of this patent is extended or adjusted under 35 U.S.C. 154(b) by 316 days.

(21) Appl. No.: 18/459,387

(22) Filed: Aug. 31, 2023

(65) Prior Publication Data

US 2024/0077785 A1 Mar. 7, 2024

(30) Foreign Application Priority Data

Sep. 2, 2022 (CN) .......................... 202222344504.8
Sep. 2, 2022 (CN) .......................... 202222347906.3

(51) Int. Cl.
*G03B 13/34* (2021.01)
(52) U.S. Cl.
CPC .................................... *G03B 13/34* (2013.01)

(58) Field of Classification Search
CPC ........... G03B 13/34; H04N 23/54; G02B 7/04
See application file for complete search history.

(56) References Cited

U.S. PATENT DOCUMENTS

| | | | |
|---|---|---|---|
| 5,218,574 A * | 6/1993 | Peregrim | F42C 13/06 |
| | | | 367/136 |
| 2013/0271619 A1* | 10/2013 | Longmore | H04N 23/66 |
| | | | 348/211.99 |
| 2017/0003576 A1* | 1/2017 | Hatakeyama | G03B 17/14 |

* cited by examiner

*Primary Examiner* — Minh Q Phan

(57) ABSTRACT

The present disclosure discloses a lens driver, which applied to a photographic device. The photographic device includes a focal ring. The lens driver includes a first housing, a driving assembly, and a mounting member. The driving assembly is arranged on the first housing and is configured to adjust the focal ring. The mounting member is arranged on the first housing and is configured to install a battery. The battery is electrically connected to the driving assembly through the mounting member. In the present disclosure, the lens driver is provided with the mounting member for installing the battery, and the mounting member is capable of electrically conducting the battery and the driving assembly. When in use, it is only need to install the battery on the mounting member, which is more convenient.

19 Claims, 12 Drawing Sheets

LENS DRIVER AND LENS DRIVER CIRCUIT

TECHNICAL FIELD

The present disclosure relates to the technical field of photographic device, in particular to a lens driver and a lens driver circuit.

BACKGROUND

A photographic device (such as camcorder or camera) commonly need to be moved according to the needs of the scene during the shooting process. During movement, the photographic device also needs to adjust the focus and focal lengths of a lens to fit the composition of the images. However, due to the heavy weight of most photographic devices, it is difficult to rotate the lens while moving the photographic devices. Currently, a lens driver is installed next to the lens to drive the rotation of a focal ring of the lens, and zooming and focusing are achieved by adjusting a lens controller that is in wired or wireless connection with the lens driver.

The lens driver generally includes a housing, a motor, and a power interface. The power interface is configured to connect an external power source to provide power to the motor and other components, so as to ensure the normal use of the lens driver. However, the lens driver in related art commonly requires an external connection cable to be connected to the external power source. If the photographers forget to bring the external connection cable, it will be inconvenient to use the lens driver.

Also, in addition to the lens driver for zoom and focus adjustment, the photographic device may also require other lens driver to adjust the transmittance of the lens filter. Therefore, at least two lens drivers are required to be installed on the photographic device. Each lens driver needs to be configured with a battery module for power supply, then multiple battery modules need to be installed on the photographic device, which makes the overall installation more complex. The multiple battery modules leads to an increased weight of the photographic device, which increases the burden of the photographers.

SUMMARY

The main purpose of the present disclosure is to provide a lens driver and a circuit thereof, aiming to solve the problem of inconvenient use of the lens driver.

In order to achieve the above purpose, the present disclosure provides a lens driver, the lens driver includes a first housing, a driving assembly, and a mounting member. The driving assembly is arranged on the first housing and is configured to adjust a focal ring. The mounting member is arranged on the first housing and is configured to install a battery. The battery is electrically connected to the driving assembly through the mounting member.

In some embodiments, the lens driver further includes a first conductive assembly and a second conductive assembly. The first conductive assembly is arranged on the mounting member and is configured to electrically connected to the battery. The second conductive assembly is arranged on a side of the first housing connected to the mounting member, and the second conductive assembly is electrically connected to the first conductive assembly and the driving assembly respectively.

In some embodiments, the mounting member is defined with a first accommodating cavity for installing the battery.

The first conductive assembly includes a first conductive member and a second conductive member. The first conductive member is arranged in the first accommodating cavity and is configured to electrically connect to the battery. The second conductive member is arranged on a side of the mounting member away from the first accommodating cavity, and the second conductive member is electrically connected to the first conductive member and the second conductive assembly respectively.

In some embodiments, the first conductive assembly further includes a circuit board. Both the first conductive member and the second conductive member are electrically connected to the circuit board.

In some embodiments, the mounting member includes a second housing and a cover. A side of the second housing is depressed to form the first accommodating cavity, and another side of the second housing is depressed to form a second accommodating cavity. The circuit board is arranged in the second accommodating cavity. The cover is covering the second accommodating cavity.

In some embodiments, the second housing is defined with a first through-hole communicating the first accommodating cavity and the second accommodating cavity. The first conductive member passes through the first through-hole. An end of the first conductive member is electrically connected to the circuit board, and the other end of the first conductive member is arranged in the first accommodating cavity.

In some embodiments, the cover is defined with a second through-hole. The second conductive member passes through the second through-hole. An end of the second conductive member is electrically connected to the circuit board, and the other end of the second conductive member extends out of the second through-hole or is flush with the second through-hole.

In some embodiments, the mounting member is detachably connected to the first housing.

In some embodiments, one of the mounting member and the first housing is defined with a slot, and the other one is provided with a block. The mounting member is connected to the first housing by way of inserting the block into the slot.

In some embodiments, the lens driver further includes a locking assembly. The locking assembly is arranged on the mounting member and/or the first housing to fix the mounting member to the first housing.

In some embodiments, the slot is defined in the mounting member and the block is arranged on the first housing. The locking assembly includes a pushing rod, a pushing portion, a hooking portion, and an elastic reset member. The pushing rod is slidably arranged within the mounting member. The pushing portion is located on an outside of the mounting member and is connected to an end of the pushing rod. The hooking portion is located within the slot and is connected to another end of the pushing rod. An end of the elastic reset member abuts the pushing portion, and the other end of the elastic reset member abuts an inner wall of the mounting member.

In some embodiments, an end of the first accommodating cavity is defined with an opening for inserting the battery. Either one of a cavity wall of the first accommodating cavity and the battery is provided with a plug block, and another one is defined with a plug slot. The battery is fixed inside the first accommodating cavity by way of inserting the plug block into the plug slot.

In some embodiments, the opening of the first accommodating cavity is provided with a snap buckle. The snap buckle abuts against the battery.

In some embodiments, the driving assembly includes a motor and a transmission assembly. The motor is located within the first housing. The transmission assembly is connected to the motor. The motor drives the transmission assembly to adjust the focal ring.

In some embodiments, the transmission assembly includes a first gear and a second gear. The first gear is mounted on an output shaft of the motor, and the second gear engages with the first gear to adjust the focal ring.

In some embodiments, the lens driver further includes a control circuit board. The first housing is provided with an interface and/or a display assembly, and the interface and/or the display assembly is electrically connected to the control circuit board. The interface is configured for charging and/or communication, and the display assembly is configured to display related information of the lens driver.

In some embodiments, the lens driver further includes a lens controller. The lens controller is communicatively connected to the driving assembly, and the lens controller is configured to control the motor to rotate.

The present disclosure further provides a lens driver circuit, and the lens driver circuit includes a motor drive module, a main control circuit, a first signal interface, and a second signal interface. The motor drive module is configured to drive a motor to rotate. The main control circuit includes a power input terminal. The main control circuit is electrically connected to the motor drive module and is configured to control the motor drive module to turn on or turn off. The first signal interface includes a first power terminal, and the first power terminal is electrically connected to the power input terminal. The second signal interface includes a second power terminal, and the second power terminal is electrically connected to the first power terminal.

In some embodiments, the lens driver circuit further includes a third signal interface. The third signal interface includes a third power terminal electrically connected to the first power terminal.

In some embodiments, the second power terminal is unidirectionally conductive to the first power terminal, and the third power terminal is unidirectionally conductive to the first power terminal.

In some embodiments, the lens driver circuit further includes a wireless transmission module. The main control circuit is electrically connected to the wireless transmission module to communicate with an external device through the wireless transmission module.

In some embodiments, the lens driver circuit further includes a display module and a button module for adjusting. Both the display module and the button module are electrically connected to the main control circuit.

In some embodiments, the first signal interface further includes a first data signal terminal, and the first data signal terminal is electrically connected to the main control circuit. The second signal interface further includes a second data signal terminal, and the second data signal terminal is electrically connected to the main control circuit.

In some embodiments, the main control circuit includes a processing unit, a voltage conversion unit, and a switching unit. The processing unit is electrically connected to the first data signal terminal, the second data signal terminal, and the motor drive module respectively. The switching unit includes an input terminal connected to the power input terminal, an output terminal connected to the voltage conversion unit, and a switching control terminal electrically connected to the processing unit. The output terminal of the switching unit is electrically connected to the motor drive module. The voltage conversion unit is electrically connected to the processing unit, and is configured to convert a voltage from the output terminal of the switching unit into a corresponding voltage to power the processing unit.

In some embodiments, the voltage conversion unit is electrically connected to the second power terminal through a unidirectional conductive unit. And/or the voltage conversion unit includes a DC/DC conversion sub-unit and at least one LDO conversion sub-unit. An end of the DC/DC conversion sub-unit is electrically connected to the output terminal of the switching unit, and another end of the DC/DC conversion sub-unit is electrically connected to input terminal of each LDO conversion sub-unit. The processing unit is connected to an output terminal of one of the LDO conversion sub-units.

In some embodiments, the main control circuit further includes a serial port conversion unit. The second data signal terminal is connected to the processing unit through the serial port conversion unit.

In some embodiments, the main control circuit further includes a sensor unit electrically connected to the processing unit. The sensor unit is configured to detect the rotation of the motor.

The present disclosure further provides a lens driver, and the lens driver includes a motor for adjusting a lens and a lens driver circuit. The lens driver circuit is electrically connected to the motor.

In the present disclosure, the lens driver is provided with the mounting member for installing the battery, and the mounting member is capable of electrically conducting the battery and the driving assembly. When in use, it is only need to install the battery on the mounting member, which is more convenient.

The realization of the purpose of the present disclosure, functional features, and advantages will be further described in conjunction with the embodiments and with reference to the accompanying drawings.

DETAILED DESCRIPTION OF THE EMBODIMENTS

The following is a clear and complete description of the embodiments of the present disclosure in conjunction with the accompanying drawings. It is obvious that the embodiments described are only a part of the embodiments of the present disclosure and not all of the embodiments. Based on the embodiments of the present disclosure, all other embodiments obtained by those skilled in the art without creative labor are within the scope of protection of the present disclosure.

It should be noted that all directional indications (such as up, down, left, right, front, back, etc.) in the embodiments of the present disclosure are only used to explain the relative position relationship and motion of various components in a specific posture (as shown in the accompanying drawings). If the specific posture changes, the directional indications will correspondingly change.

It should also be noted that when a component is referred to as "fixed on" or "installed on" another component, the component may be directly on the other component or may exist with an intermediary component. When a component is referred to as "connected" to another component, the component may be directly connected to the other component or may exist with an intermediary component.

In addition, the terms such as "first", "second", etc. in the present disclosure are used for descriptive purposes only and should not be construed as indicating or implying relative importance or implying a specific quantity of the indicated technical features. Therefore, features designated as "first" or "second" may explicitly or implicitly include at least one instance of that feature. In addition, the technical solutions of different embodiments may be combined with each other, but it should be based on what those skilled in the art can achieve. When the combination of the technical solutions conflicts with each other or cannot be realized, it should be considered that the combination of the technical solutions does not exist and is not within the scope of protection of the present disclosure.

Figure 1:
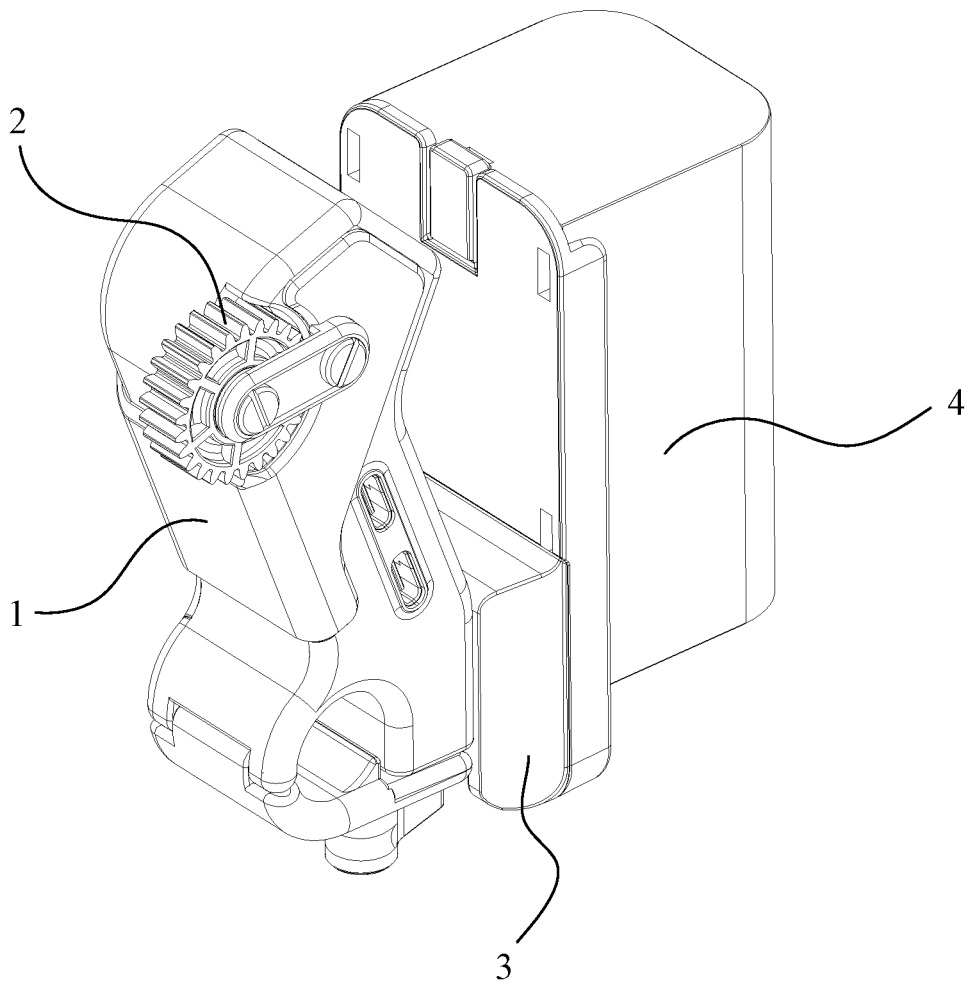
FIG. 1 is a perspective view of a lens driver and a battery according to an embodiment of the present disclosure.
Figure 2:
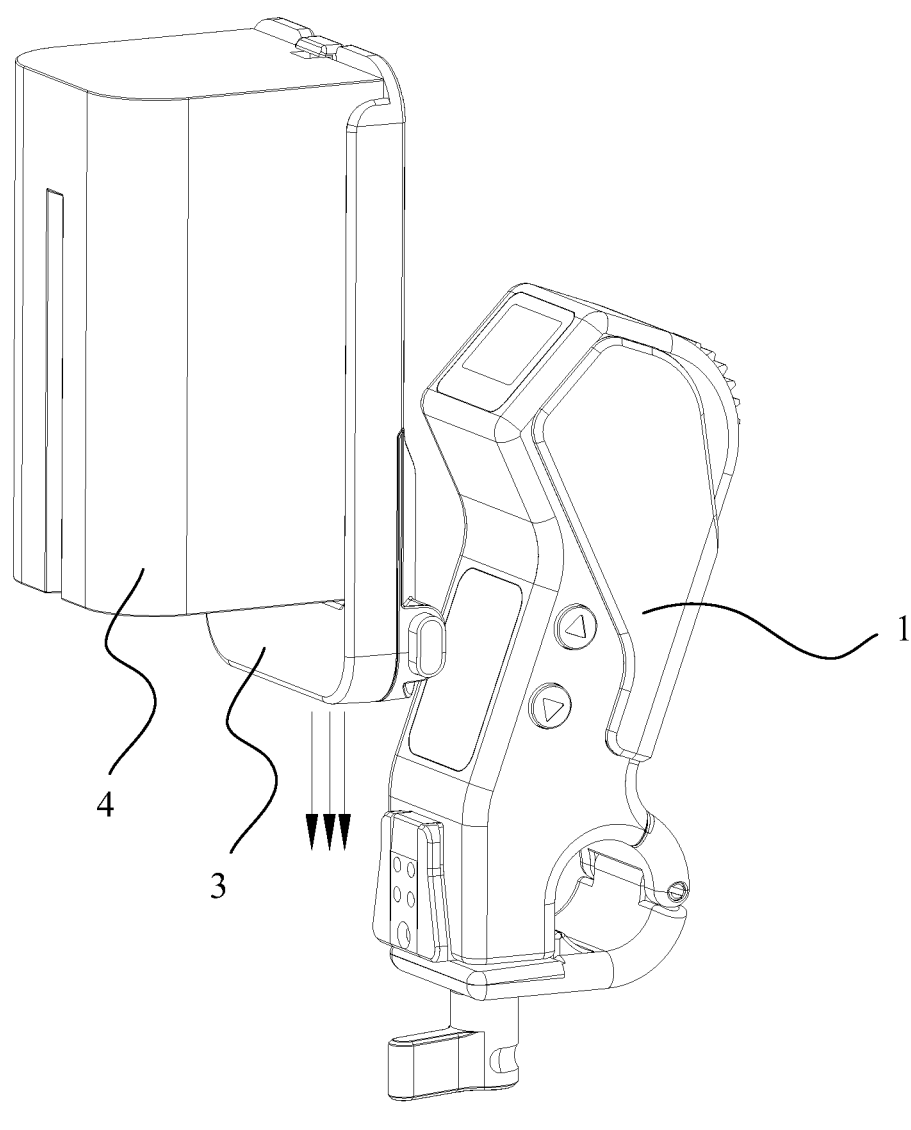
FIG. 2 is a perspective view showing an assembly of a mounting member and a first housing of the lens driver of FIG. 1.

The present disclosure provides a lens driver, referring to FIG. 1 and FIG. 2, the lens driver includes a first housing 1, a driving assembly 2, and a mounting member 3.

The driving assembly 2 is arranged on the first housing 1 and configured to adjust a focal ring of photographic device.

The mounting member 3 is arranged on the first housing 1 and configured to install a battery 4, and the battery 4 is electrically connected to the driving assembly 2 through the mounting member 3.

In this embodiment, the first housing 1 is generally rod-shaped to facilitate users to grip and use. The first housing 1 is provided with the driving assembly 2, and the driving assembly 2 is configured to adjust the focal ring of the photographic device instead of user's hands, to achieve automatically adjusting the photographic device. A cavity is defined in the first housing 1 for accommodating the driving assembly 2. The driving assembly 2 includes a power source and a power transmission assembly. The power source is arranged in the cavity, and the power transmission assembly is at least partially located outside the cavity to adjust the focal ring of the photographic device.

A side of the first housing 1 is provided with the mounting member 3. The mounting member 3 is configured to install the battery 4, and provides electrical connection between the driving assembly 2 and the battery 4, allowing the battery 4 to power the driving assembly 2. That is to say, the mounting member 3 is electrically connected to the driving assembly 2, either through wires or conductive components such as probes. The battery 4 is wirelessly connected to the mounting member 3, for example, using the conductive probes mentioned above. In particular, the conductive probes may be installed on the mounting member 3, and the conductive probes are electrically connected to the driving assembly 2. When the battery 4 is installed on the mounting member 3, electrodes of the battery 4 contact with and electrically connect to the conductive probes, thereby establishing electrical connection with the driving assembly 2, which is more convenient for using.

In some embodiments, the mounting component 3 and the first housing 1 may be an integral structure or independent structures.

In some embodiments, referring to FIG. 3 to FIG. 7, the present disclosure provides the lens driver further including a first conductive assembly 5 and a second conductive assembly 6.

The first conductive assembly 5 is arranged on the mounting member 3 and configured to electrically connect to the battery 4.

The second conductive assembly 6 is arranged on a side of the first housing 1 connected to the mounting member 3, and the second conductive assembly 6 is electrically connected to the first conductive assembly 5 and the driving assembly 2 respectively.

In this embodiment, the first conductive assembly 5 and the second conductive assembly 6 are provided between the mounting member 3 and the first housing 1. The second conductive assembly 6 is electrically connected to the first conductive assembly 5 and the driving assembly 2 respectively. When the battery 4 is installed on the mounting member 3, the electrodes of the battery 4 are electrically connected to the first conductive assembly 5. As the first conductive assembly 5 and the second conductive assembly 6 are electrically connected, the battery 4 is connected to the driving assembly 2.

In some embodiments, the first conductive assembly 5 is arranged on the mounting member 3, and the second conductive component 6 is arranged on the first housing 1. When the mounting member 3 is connected to the first housing 1, the first conductive assembly 5 and the second conductive assembly 6 establish electrical connection. Both the first conductive assembly 5 and the second conductive assembly 6 are conductive columns.

In some embodiments, referring to FIG. 3 to FIG. 7, the present disclosure provides the mounting member 3 defined with a first accommodating cavity 31 for installing the battery 4. The first conductive assembly 5 includes a first conductive member 51 and a second conductive member 52.

The first conductive member 51 is arranged in the first accommodating cavity 31 and configured to electrically connect with the battery 4.

The second conductive member 52 is arranged on a side of the mounting member 3 away from the first accommodating cavity 31, the second conductive member 52 is electrically connected to the first conductive member 51 and the second conductive assembly 6 respectively.

In this embodiment, a middle portion of the mounting member 3 is defined with the first accommodating cavity 31 that matches the battery 4. The size and shape of the first accommodating cavity 31 can be designed based on the battery 4. The first conductive assembly 5 includes the first conductive member 51 and the second conductive member 52. The first conductive member 51 is at least partially arranged in the first accommodating cavity 31 to establish electrical connection with the battery 4. The second conductive member 52 is at least partially located outside the mounting member 3 to establish electrical connection with the second conductive assembly 6. Additionally, the second conductive member 52 is electrically connected to the first conductive member 51.

Figure 7:
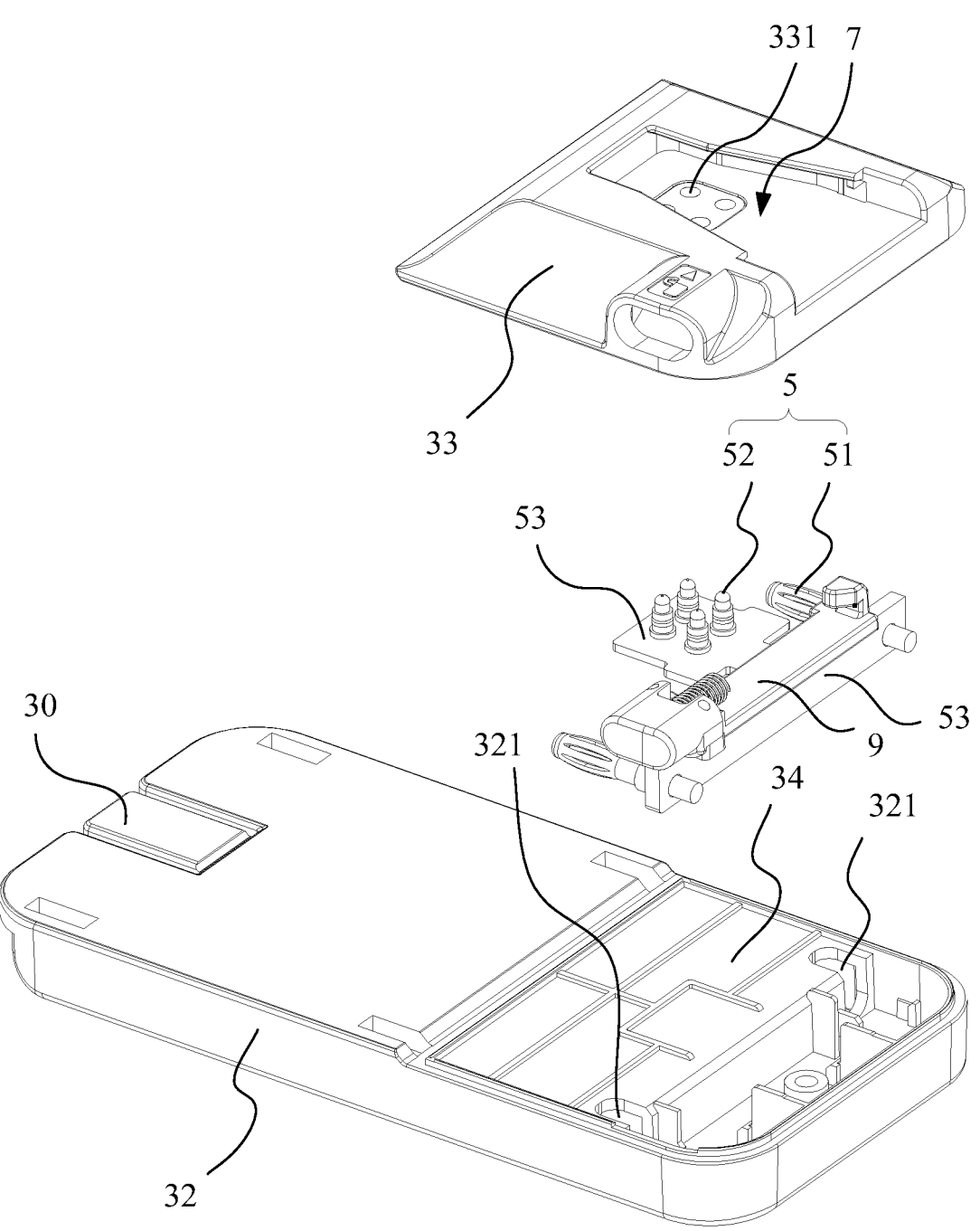
FIG. 7 is an exploded view of the mounting member of FIG. 6.
Figure 8:
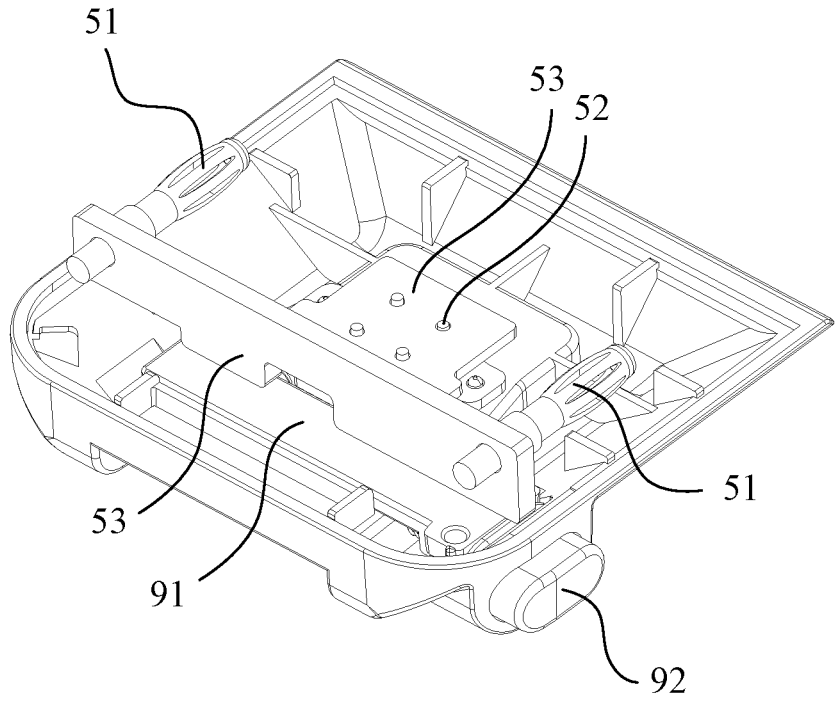
FIG. 8 is a perspective view of a cover of FIG. 7.
Figure 9:
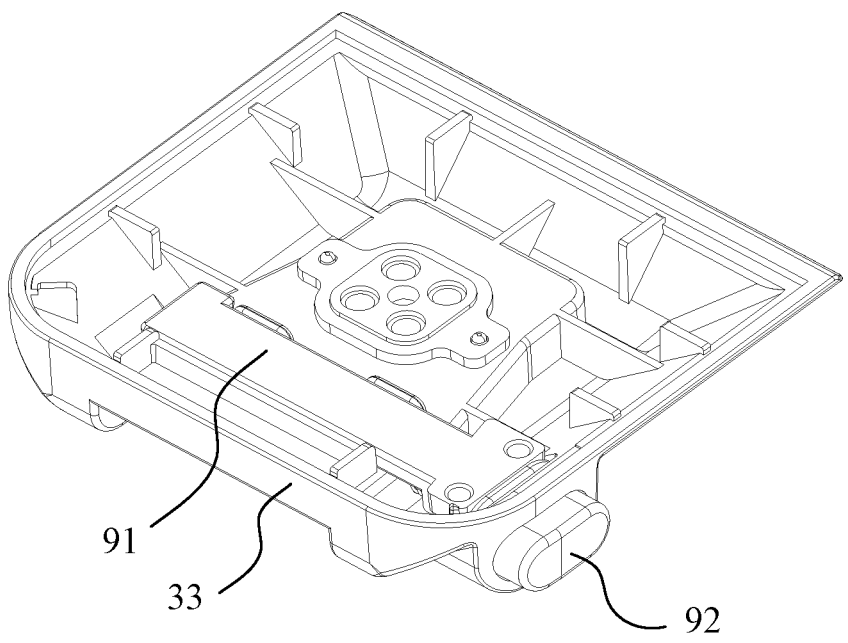
FIG. 9 is a perspective view of the cover of FIG. 8 without assembly of a first conductive assembly.
Figure 10:
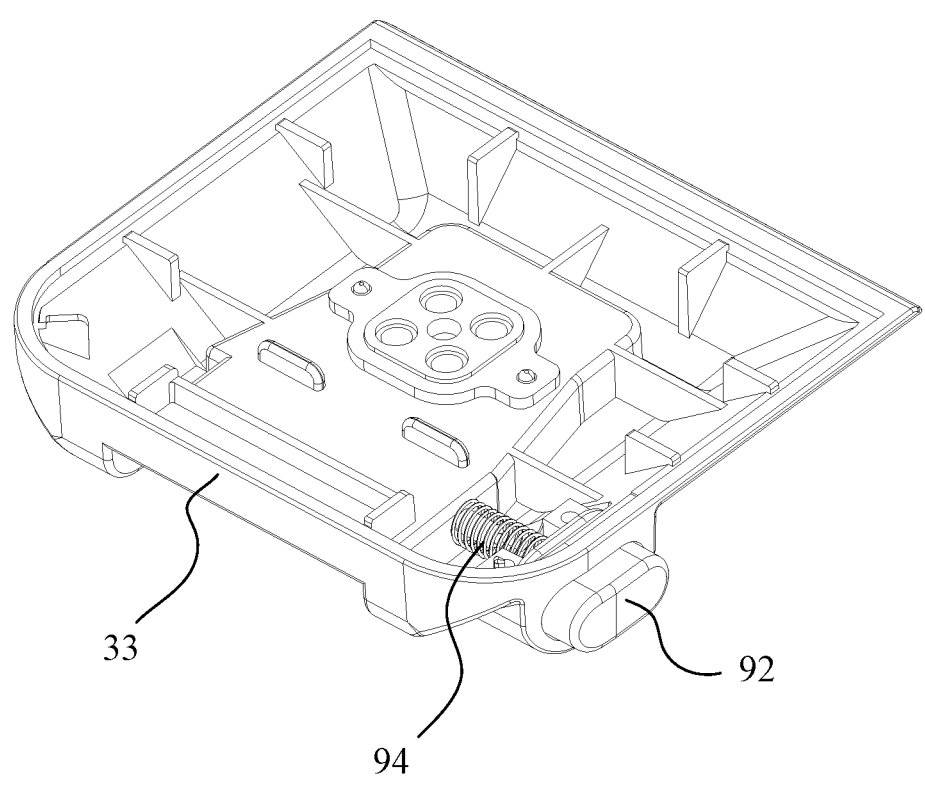
FIG. 10 is a perspective view of the cover of FIG. 9 without assembly of a pushing rod.
Figure 11:
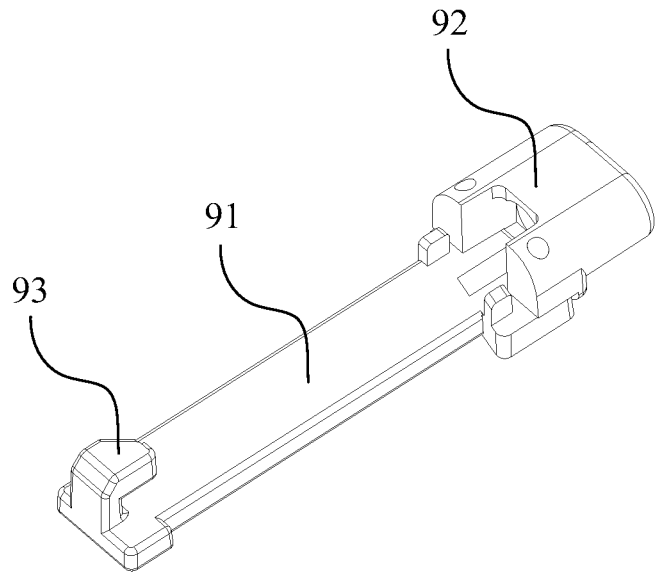
FIG. 11 is a perspective view of a locking assembly of FIG. 7.

In some embodiments, referring to FIG. 7, the present disclosure provides the first conductive assembly 5 further including a circuit board 53. Both the first conductive member 51 and the second conductive member 52 are electrically connected to the circuit board 53.

In this embodiment, the first conductive member 51 and the second conductive member 52 are electrically connected through the circuit board 53. The circuit board 53 is located inside the mounting member 3. An end of the first conductive member 51 is electrically connected to the circuit board 53, and another end of the first conductive member 51 inside the first accommodating cavity 31 is exposed to establish electrical connection with the battery 4. An end of the second conductive member 52 is electrically connected to the circuit board 53, and another end is exposed outside the mounting member 3 to establish electrical connection with the second conductive assembly 6. The circuit board 53 may include a first circuit board and a second circuit board, with the first circuit board and the second circuit board being electrically connected. The end of the first conductive member 51 is arranged on the first circuit board, and the end of the second conductive member 52 is arranged on the second circuit board.

In some embodiments, referring to FIG. 7, the present disclosure provides the mounting member 3 including a second housing 32 and a cover 33.

A side of the second housing 32 is depressed to form the first accommodating cavity 31, another side of the second housing 32 is depressed to form the second accommodating cavity 34, and the circuit board 53 is arranged in the second accommodating cavity 34.

The cover 33 covers the second accommodating cavity 34.

In this embodiment, the mounting member 3 includes the second housing 32 and the cover 33. The side of the second housing 32 is depressed to form the first accommodating cavity 31, and another side of the second housing 32 is depressed to form the second accommodating cavity 34. The second accommodating cavity 34 is configured to accommodate components such as the circuit board 53, the first conductive member 51, the second conductive member 52, etc. The cover 33 is configured to cover an opening of the second accommodating cavity 34 to make the second accommodating cavity 34 be isolated from outside.

In some embodiments, referring to FIG. 7, the present disclosure provides the second housing 32 defining with a first through-hole 321 communicating the first accommodating cavity 31 and the second accommodating cavity 34.

The first conductive member 51 passes through the first through-hole 321. An end of the first conductive member 51 is electrically connected to the circuit board 53, and the other end of the first conductive member 51 is arranged in the first accommodating cavity 31.

In this embodiment, the second housing 32 is defined with the first through-hole 321. The first through-hole 321 communicates the first accommodating cavity 31 and the second accommodating cavity 34, so that the end of the first conductive member 51 is electrically connected to the circuit board 53, and the other end within the first accommodating cavity 31 is exposed to be electrically connected to the battery 4.

In some embodiments, referring to FIG. 7, the present disclosure provides the cover 33 defining with a second through-hole 331. The second conductive member 52 passes through the second through-hole 331. An end of the second conductive member 52 is electrically connected to the circuit board 53, and the other end of the second conductive member 52 extends out of the second through-hole 331 or is flush with the second through-hole 331.

In this embodiment, the cover 33 is defined with the second through-hole 331 for the second conductive member 52 to pass through the cover 33. The end of the second conductive member 52 is electrically connected to the circuit board 53, and the other end may extend out of the second through-hole 331 or be flush with the second through-hole 331. When the mounting member 3 is connected to the first housing 1, it is only need to ensure that the second conductive member 52 is electrically connected to the driving assembly 2.

Figure 3:
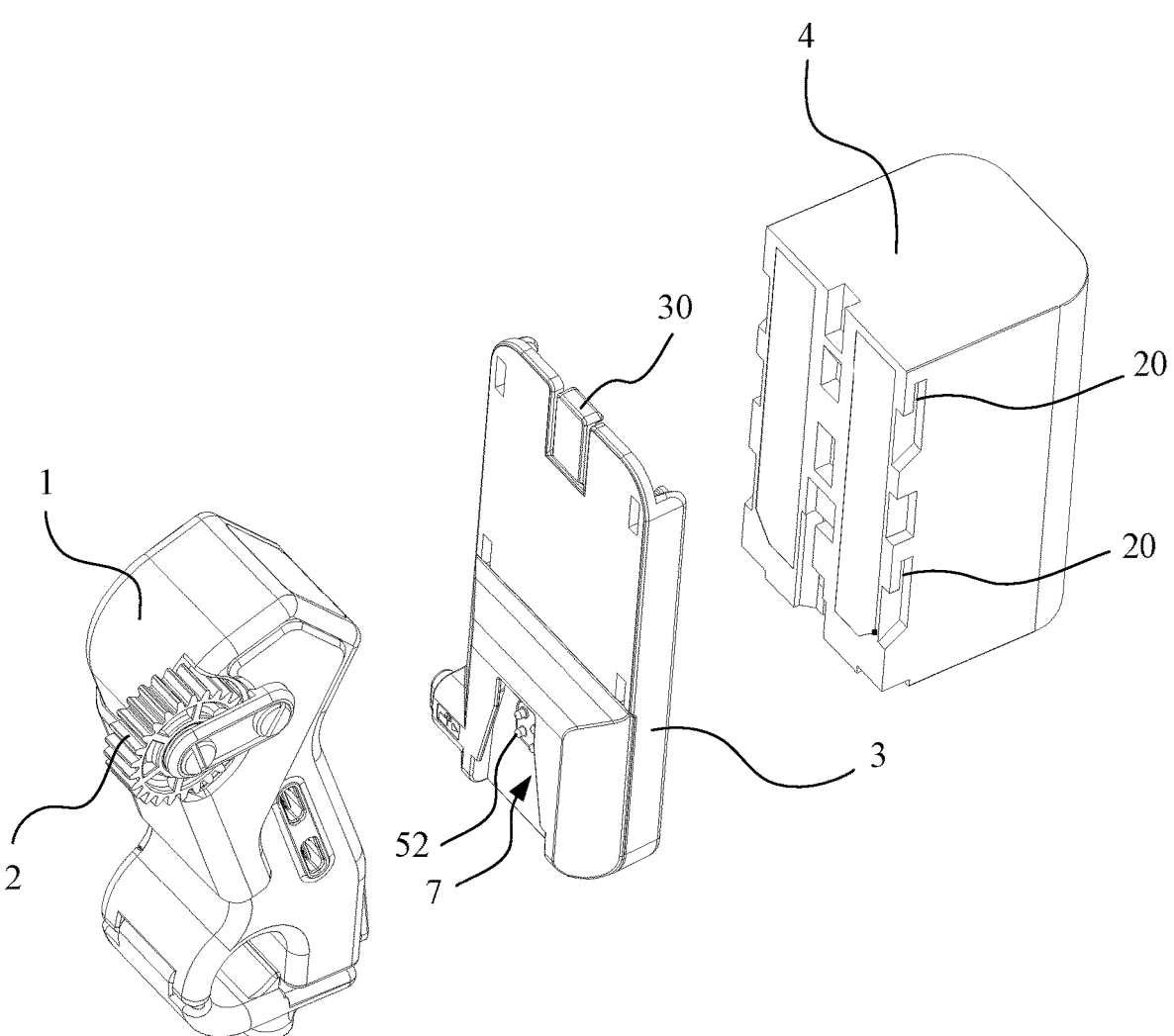
FIG. 3 is an exploded view of the lens driver and the battery of FIG. 1.

In some embodiments, referring to FIG. 3, the present disclosure provides the mounting member 3 being detachably connected to the first housing 1.

In this embodiment, the mounting member 3 is detachably connected to the first housing 1. In case the mounting member 3 is damaged, the mounting member 3 can be directly replaced without having to replace the mounting member 3 together with the first housing 1. In case the mounting member 3 needs to be repaired, the mounting member 3 can be removed from the first housing 1 to be repaired, which facilitates the maintenance work.

Figure 4:
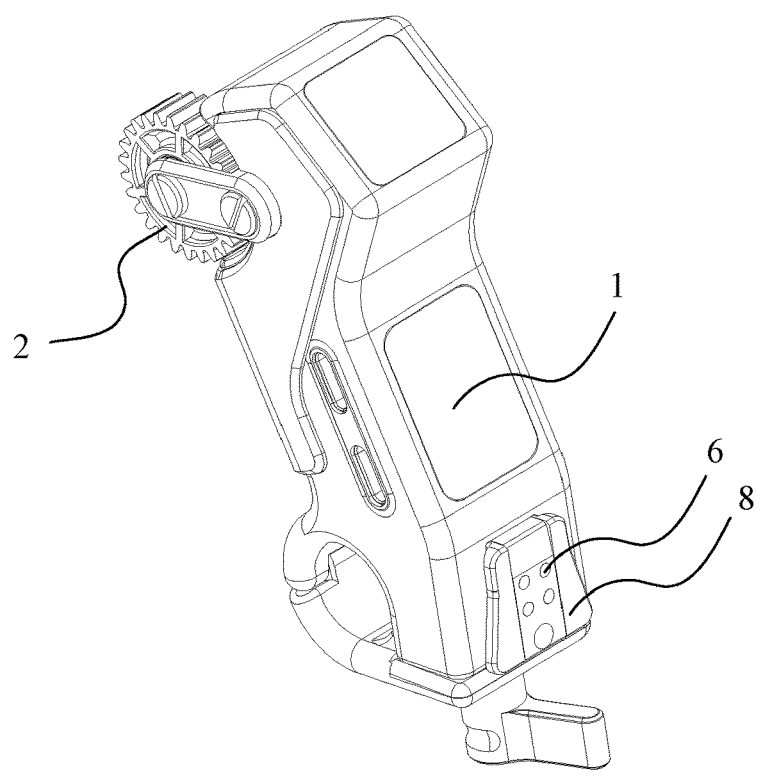
FIG. 4 is a perspective view of the first housing of FIG. 1.

In some embodiments, referring to FIG. 3 and FIG. 4, one of the mounting member 3 and the first housing 1 is defined with a slot 7 and the other one is provided with a block 8. The mounting member 3 is connected to the first housing 1 by way of inserting the block 8 into the slot 7.

In this embodiment, the mounting member 3 and the first housing 1 are detachably connected by snapping connection. One of the mounting member 3 and the first housing 1 is defined with the slot 7, and the other one is provided with the block 8. When installing the mounting member 3 to the first housing 1, the block 8 is aligned with the slot 7 and then inserted into the slot 7. In this embodiment, the mounting member 3 is defined with the slot 7, and the first housing 1 is provided with the block 8. The block 8 protrudes on a surface of the first housing 1 connecting to the mounting member 3.

Figure 6:
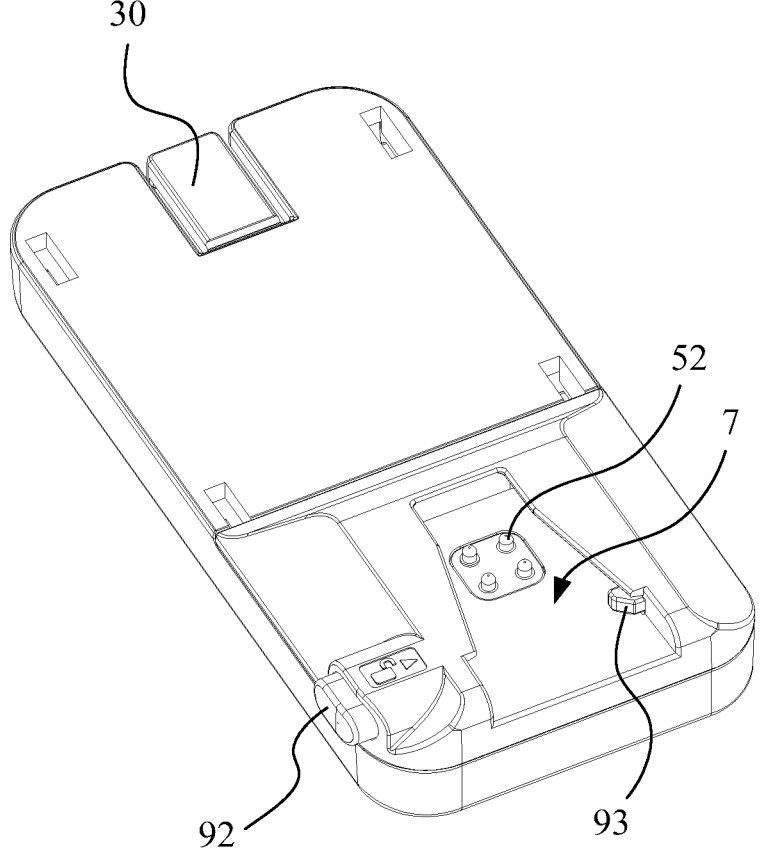
FIG. 6 is a perspective view of the mounting member of FIG. 5 from another perspective.

In some embodiments, referring to FIG. 6 and FIG. 7, the present disclosure provides the lens driver including a locking assembly 9. The locking assembly 9 is arranged on the mounting member 3 and/or the first housing 1 to fix the mounting member 3 to the first housing 1.

In this embodiment, in order to prevent detachment of the mounting member 3 from the first housing 1 during using, the mounting member 3 and/or the first housing 1 is provided with the locking assembly 9 to secure the mounting member 3 on the first housing 1 by means of the locking assembly 9.

In some embodiments, referring to FIG. 6 to FIG. 11, the present disclosure provides the slot 7 defined in the mounting member 3 and the block 8 arranged on the first housing 1. The locking assembly 9 includes a pushing rod 91, a pushing portion 92, a hooking portion 93, and an elastic reset member 94.

The pushing rod 91 is slidably arranged within the mounting member 3.

The pushing portion 92 is located on an outside of the mounting member 3 and connected to an end of the pushing rod 91.

The hooking portion 93 is located within the slot 7 and connected to another end of the pushing rod 91.

An end of the elastic reset member 94 abuts the pushing portion 92, and the other end of the elastic reset member 94 abuts an inner wall of the mounting member 3.

In this embodiment, the locking assembly 9 includes the pushing rod 91, the pushing portion 92, the hooking portion 93, and the elastic reset member 94. The pushing portion 92 is connected to one end of the pushing rod 91, and the hooking portion 93 is connected to the other end of the pushing rod 91. The pushing portion 92 is located on the outside of the mounting member 3 for users to press. The hooking portion 93 is located within the slot 7 to abut against the block 8 on the first housing 1, thereby fixing the mounting member 3 to the first housing 1. During installing the mounting member 3 on the first housing 1, the pushing portion 92 is first pressed to drive both the pushing rod 91 and the hooking portion 93 to move in a first direction, causing the hooking portion 93 to retreat to a first position. Then, the block 8 on the first housing 1 is aligned with the slot 7 of the mounting member 3 and inserted into the slot 7. Then, the pushing portion 92 is released, and the pushing rod 91 retracts to an initial position under the action of the elastic reset member 94, causing the hooking portion 93 to hook onto the block 8 on the first housing 1, thus achieving a locking of the mounting member 3 to the first housing 1.

Figure 5:
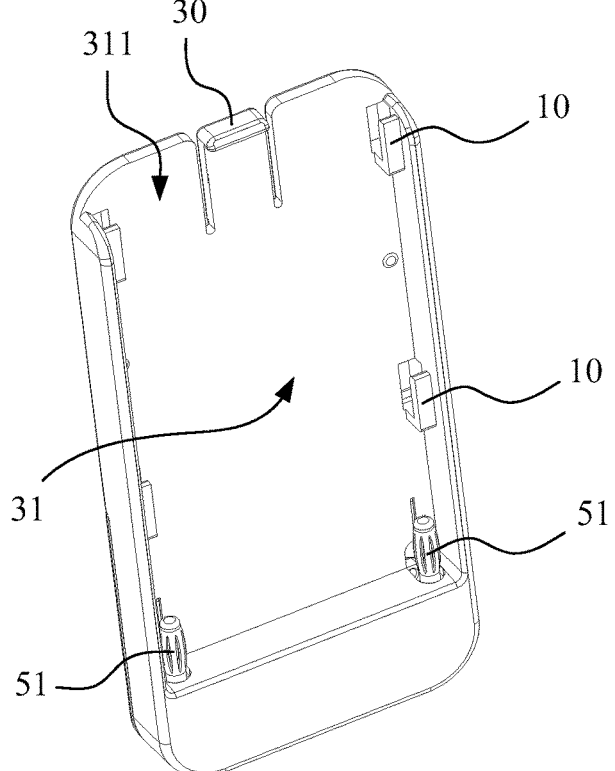
FIG. 5 is a perspective view of the mounting member of FIG. 1.

In some embodiments, referring to FIG. 3 to FIG. 5, an end of the first accommodating cavity 31 is defined with an opening 311 for inserting the battery 4. One of the battery 4 and a wall of the first accommodating cavity 31 is provided with a plug block 10, and the other one is defined with a plug slot 20. The battery 4 is fixed inside the first accommodating cavity 31 by way of inserting the plug block 10 into the plug slot 20.

In this embodiment, the first accommodating cavity 31 is provided in a rectangular shape, and the end of the first accommodating cavity 31 is defined with the opening 311 for inserting the battery 4. After the battery 4 is inserted into the first accommodating cavity 31, the plug block 10 is inserted into the plug slot 20 to fix the battery 4 in the first accommodating cavity 31. The plug block 10 and the plug slot 20 are arranged on the first accommodating cavity 31 and the battery 4. In this embodiment, the plug block 10 is arranged on the wall of the first accommodating cavity 31, the plug slot 20 is defined in a side wall of the battery 4 correspondingly. After the battery 4 is inserted into the first accommodating cavity 31 through the opening 311, the plug block 10 is correspondingly inserted into the plug slot 20, thereby fixing the battery 4 on the mounting member 3.

In some embodiments, referring to FIG. 3 and FIG. 5, a snap buckle 30 is arranged at the opening 311 of the first accommodating cavity 31. The snap buckle 30 abuts against the battery 4.

In this embodiment, in order to prevent the battery 4 detaching from the opening 311 of the first accommodating cavity 31, the opening 311 is provided with the snap buckle 30. The snap buckle 30 has a certain elasticity. When the battery 4 is inserted into the first accommodating cavity 31 through the opening 311, the snap buckle 30 is deformed and retracts to a second position due to the squeezing of the battery 4, allowing the battery 4 to be inserted into the first accommodating cavity 31. After the battery 4 is fully inserted into the first accommodating cavity 31, the snap buckle 30 of the opening 311 is no longer subjected to the squeezing of the battery 4 and retracts to an initial position under the action of a restoring force to clamp a side of the battery 4, thereby achieving the fixing of the battery 4.

Figure 12:
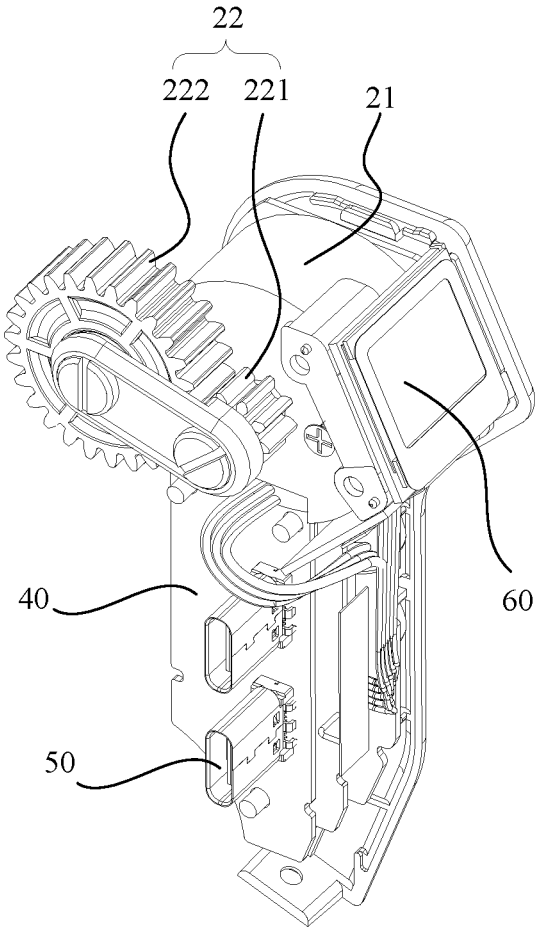
FIG. 12 shows a internal structure of the first housing of FIG. 1.

In some embodiments, referring to FIG. 12, the present disclosure provides the driving assembly 2 including a motor 21 and a transmission assembly 22.

The motor 21 is located within the first housing 1.

The transmission assembly 22 is connected to the motor 21. The motor 21 drives the transmission assembly 22 to adjust the focal ring.

In this embodiment, the driving assembly 2 includes the motor 21 and the transmission assembly 22. The motor 21 is arranged in the first housing 1 for driving the transmission assembly 22. An end of the transmission assembly 22 is connected to the motor 21, and the other end is configured to adjust the focal ring of the photographic device.

In some embodiments, referring to FIG. 12, the present disclosure provides the transmission assembly 22 including a first gear 221 and a second gear 222. The first gear 221 is mounted on an output shaft of the motor 21, and the second gear 222 engages with the first gear 221 to adjust the focal ring.

In this embodiment, the transmission assembly 22 includes the first gear 221 and the second gear 222. The first gear 221 is mounted on the output shaft of the motor 21, and engages with the second gear 222. The second gear 222 is configured to adjust the focal ring of the photographic device. The motor 21 rotates to drive the first gear 221 to rotate, and rotation of the first gear 221 drives the second gear 222 to rotate. Rotation of the second gear 222 drives the focal ring that is engaged with the second gear 222 to rotate. The second gear 222 is mounted on a fixing shaft, and the fixing shaft is installed on the first housing 1.

In some embodiments, referring to FIG. 12, the present disclosure provides the lens driver including a control circuit board 40. The first housing 1 is provided with an interface 50 and/or a display assembly 60. The interface 50 and/or the display assembly 60 is electrically connected to the control circuit board 40. The interface 50 is configured for charging and/or communication, and the display assembly 60 is configured to display related information of the lens driver.

In this embodiment, the lens driver further includes the control circuit board 40. The control circuit board 40 is located inside the first housing 1. The control circuit board 40 may be provided with the interface 50 and/or the display assembly 60. The interface 50 and/or the display assembly 60 is electrically connected to the control circuit board 40. The lens driver can be charged through the interface 50, and can also be communication connected to a lens controller through the interface 50. The lens driver can also charge another lens driver through the interface 50, or communicate with another lens driver through the interface 50. There may be multiple interfaces 50, such as two, three, four, five, etc. In an exemplary embodiment, there are two interfaces 50. The display assembly 60 may display present status information and operating status information of the lens driver, such as a rotation angle of the focal ring, remaining power, angle position information, and communication channel information of the lens driver, etc.

In some embodiments, the present disclosure provides the lens driver further including a lens controller. The lens controller is communicatively connected to the driving assembly 2, and the lens controller is configured to control the motor 21 to rotate.

The present disclosure further provides a lens driver circuit applied to the lens driver of the photographic device. The photographic device may include camcorder, camera, etc. The lens driver is configured to drive a zoom ring, the focal ring, or a filter of lens of the photographic device, to adjust zoom, focus, or light transmission of the lens accordingly. In this embodiment, the lens driver circuit is applied to the lens driver described in the above embodiments.

Figure 13:
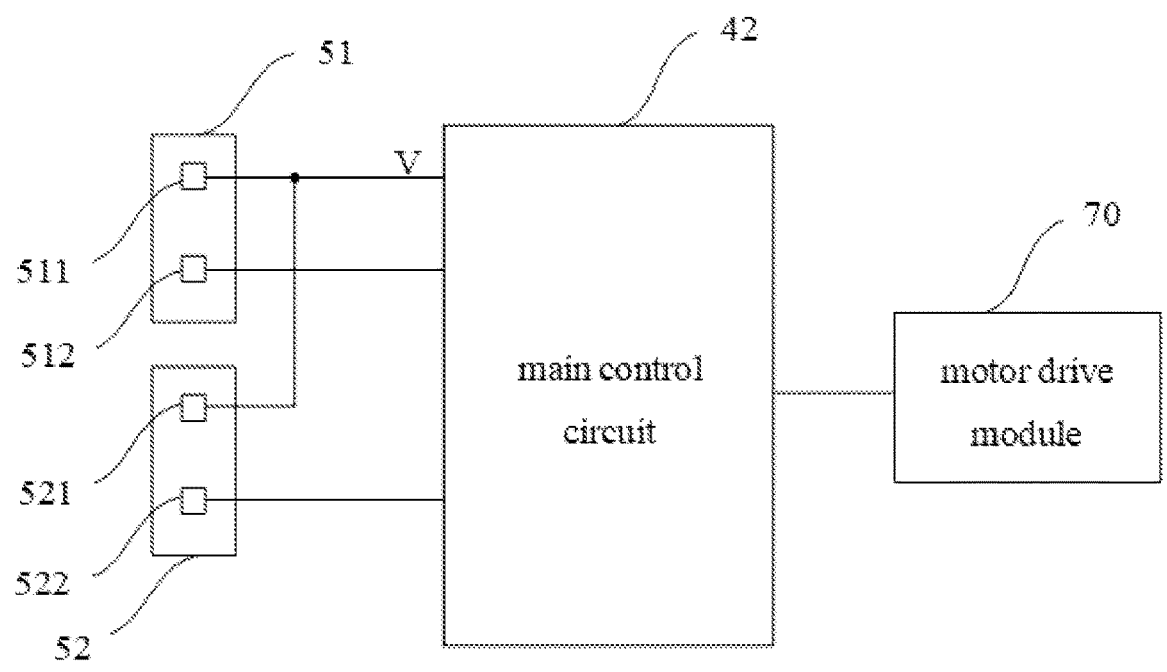
FIG. 13 is a schematic block diagram of a lens driver circuit according to a first embodiment of the present disclosure.

Referring to FIG. 13, in this embodiment, the lens driver circuit includes a motor drive module 70, a main control circuit 42, a first signal interface 51, and a second signal interface 52.

The motor drive module 70 is electrically connected to the driving assembly 2. The rotating shaft of the motor 21 is connected to the transmission assembly 22. The motor drive module 70 is configured to drive the motor 21 to rotate, to allow the transmission assembly 22 to adjust the focal ring, so as to achieve zoom adjustment, focus adjustment, or light transmission adjustment of the lens.

The main control circuit 42 is arranged on the control circuit board 40. The main control circuit 42 includes a power input terminal V. The power input terminal V is configured to receive voltage input and provide voltage to the main control circuit 42. The main control circuit 42 is electrically connected to the motor drive module 70, and is configured to control the motor drive module 70 to turn on or turn off. The main control circuit 42 also controls working parameters (such as driving power, driving duration, etc.) of the motor drive module 70 to control the adjustment of the zoom, the focus, or the light transmission of the lens by the driving assembly 2.

The first signal interface 51 includes a first power terminal 511, and the first power terminal 511 is electrically connected to the power input terminal V. The second signal interface 52 includes a second power terminal 521, and the second power terminal 521 is electrically connected to the first power terminal 511. In this embodiment, the interface 50 includes the first signal interface 51 and the second signal interface 52. The lens driver can be electrically connected to a power source (such as a battery module, a power bank, etc.) through the first signal interface 51, allowing the power source to provide voltage to the power input terminal V through the first power terminal 511. The lens driver can also be electrically connected to the power source through the second signal interface 52, allowing the power source to provide voltage to the power input terminal V through the second power terminal 521. Furthermore, since the first power terminal 511 is connected to the second power terminal 521, when one of the first signal interface 51 and the second signal interface 52 is connected to the power source, the other signal interface may output voltage to power other devices or other lens drivers. For example, in case a plurality of lens drivers with the lens driver circuit are installed in a photographic device, it is only need to connect one signal interface (either the first signal interface 51 or the second signal interface 52) of one of the lens drivers (marked as the first lens driver) to the power source. Another signal interface of the first lens driver is connected to one signal interface of a second lens driver through a signal wire, and another signal interface of the second lens driver is connected to one signal interface of a third lens driver through another signal wire. By connecting the lens drivers in this way, multiple lens drivers can be powered by one power source.

In this embodiment, the lens driver circuit includes two signal interfaces (the first signal interface 51 and the second signal interface 52), and power terminals (the first power terminal 511 and the second power terminal 521) of the two signal interfaces are electrically connected to the power input terminal V of the main control circuit 42. Therefore, when the photographic device is provided with multiple lens drivers using the lens driver circuit, it is only need to connect one signal interface of one of the lens drivers to the power source, and another signal interface is connected in series with the signal interfaces of the rest of the lens drivers, so as to realize that a single power source can provide power to multiple lens drivers. Compared with the related solutions, the lens driver circuit of this embodiment reduces the number of the power source required for the installation of multiple lens drivers in the photographic device, simplifies the installation of power sources, reduces the overall weight of the photographic device, and alleviates the burden on users.

Figure 14:
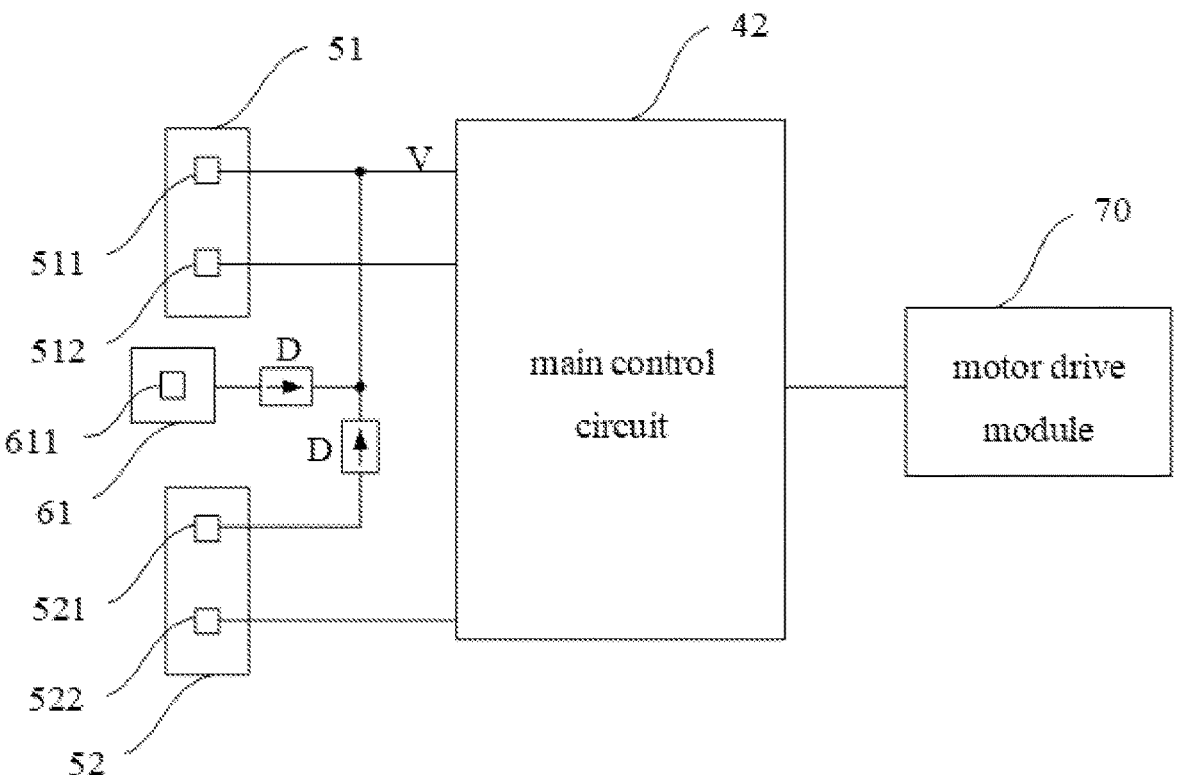
FIG. 14 is a schematic block diagram of the lens driver circuit according to a second embodiment of the present disclosure.

Referring to FIG. 14, in this embodiment, the lens driver circuit further includes a third signal interface 61. The third signal interface 61 includes a third power terminal 611 electrically connected to the first power terminal 511. In this embodiment, the power source can also be connected to the lens driver through the third signal interface 61, and other signal interfaces (the first signal interface 51 and the second signal interface 52) can be configured to provide voltage to other lens drivers through signal wires. Additionally, in the case where multiple lens drivers of one photographic device are connected in series to share one power source, if current power level of the power source is insufficient (running low), a new power source can be connected to the third signal interface 61 of one of the lens drivers before disconnecting the depleted power source. This ensures continuous power supply to the lens drivers, that is, when replacing the power source, there is no need to interrupt and reboot the lens driver, which preserves the normal shooting of the photographic device, and simplifies the process of changing the power source.

In some embodiments, the third signal interface 61 is electrically connected to the second conductive assembly 6. The third signal interface 61 is configured to electrically connect to the battery 4 mounted on the lens driver. The third signal interface 61 may be an interface in the form of a conductive contact for quick connection to the battery 4.

Referring to FIG. 14, in this embodiment, the second power terminal 521 is unidirectionally conductive to the first power terminal 511, and the third power terminal 611 is unidirectionally conductive to the first power terminal 511. For example, the second power terminal 521 and the first power terminal 511 are electrically connected through a unidirectional conductive unit D, and the third power terminal 611 and the first power terminal 511 are also electrically connected through another unidirectional conductive unit D. The unidirectional conductive unit D can be a diode or other similar units or circuit units. By setting the second power terminal 521 and the third power terminal 611 to unidirectionally conductive to the first power terminal 511, the first signal interface 51 and the second signal interface 52 can receive different voltage inputs. For example, the first signal interface 51 is configured to receive larger voltage inputs (e.g., 5V to 17V), and the second signal interface 52 is configured to receive smaller voltage inputs (e.g., less than or equal to 5V). The third signal interface 61 is configured to electrically connect to the battery 4 to provide voltage to the power input terminal V.

Figure 15:
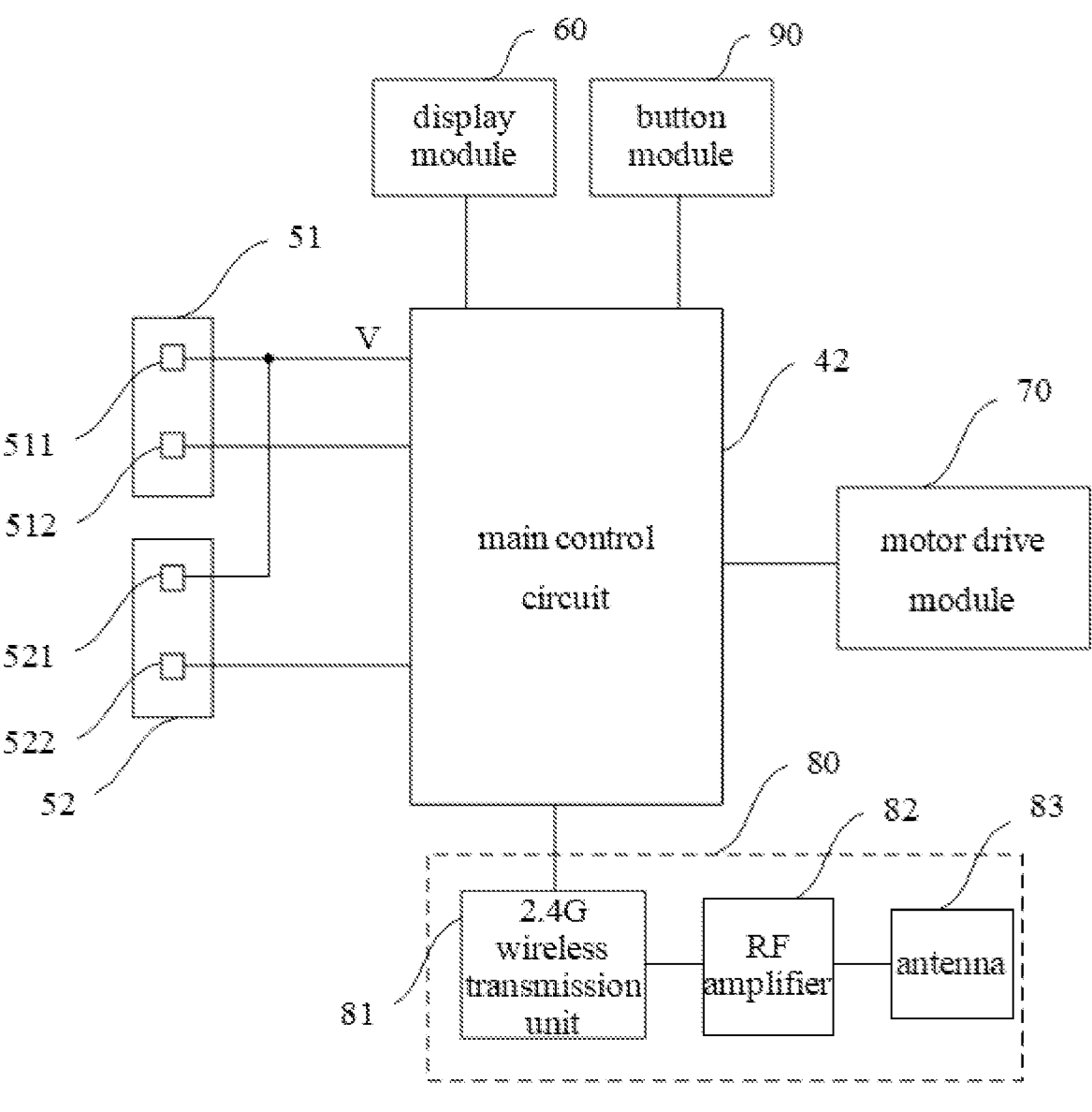
FIG. 15 is a schematic block diagram of the lens driver circuit according to a third embodiment of the present disclosure.

Referring to FIG. 15, in this embodiment, the lens driver circuit further includes a wireless transmission module 80. The main control circuit 42 is electrically connected to the wireless transmission module 80 to communicate with an external device through the wireless transmission module 80. For example, the main control circuit 42 may establish a wireless communication connection with the lens controller through the wireless transmission module 80. As such, the main control circuit 42 may send the status information and data of the lens driver to the lens controller through the wireless transmission module 80, and receive adjustment signals or other control signals sent by the lens controller through the wireless transmission module 80. This allows users to remotely control the lens driver through the lens controller and realize wireless focus control.

In some embodiments, the wireless transmission module 80 includes a 2.4G wireless transmission unit 81, an RF amplifier 82, and an antenna 83. The main control circuit 42 is electrically connected to the 2.4G wireless transmission unit 81, the 2.4G wireless transmission unit 81 is electrically connected to the RF amplifier 82, and the RF amplifier 82 is electrically connected to the antenna 83. Of course, in other embodiments, the wireless transmission module 80 may be another communication module, such as a Bluetooth communication module.

In some embodiments, the lens driver circuit further includes a display module 60 and a button module 90 for adjusting. Both the display module 60 and the button module 90 are electrically connected to the main control circuit 42. The display module 60 is configured to display a preset status information of the lens driver. The display module 60 may be an OLED display screen, and the preset status information may include angle position information, power level, and communication channel information of the lens driver, etc. The button module 90 may include at least one function button, such as adjustment buttons (up button and down button). In this embodiment, the button module 90 includes two adjustment buttons, and the two adjustment buttons are arranged on the first housing 1.

Referring to FIG. 13 to FIG. 16, in some embodiments, the first signal interface 51 further includes a first data signal terminal 512, and the first data signal terminal 512 is electrically connected to the main control circuit 42. The second signal interface 52 further includes a second data signal terminal 522, and the second data signal terminal 522 is electrically connected to the main control circuit 42. Transmission of data signals or the control signals between the main control circuit 42 and the lens controller, or between the main control circuit 42 and the other lens drivers, or between the main control circuit 42 and the photographic device can be achieved through the first data signal terminal 512 or the second data signal terminal 522. For example, the first signal interface 51 of one of the lens drivers is connected to the lens controller through signal wire, and the second signal interface 52 is connected to the first signal interface 51 of another lens driver. In this way, the lens controller can exchange signals with two lens drivers through the signal wires. For another example, the first signal interface 51 of one of the lens drivers is connected to the lens controller through the signal wire, and the second signal interface 52 is connected to the photographic device through a data cable that matched the photographic device. The lens controller can control the lens driver to send a recording start/stop signal to the photographic device, thereby controlling recording start or recording stop of the photographic device.

Figure 16:
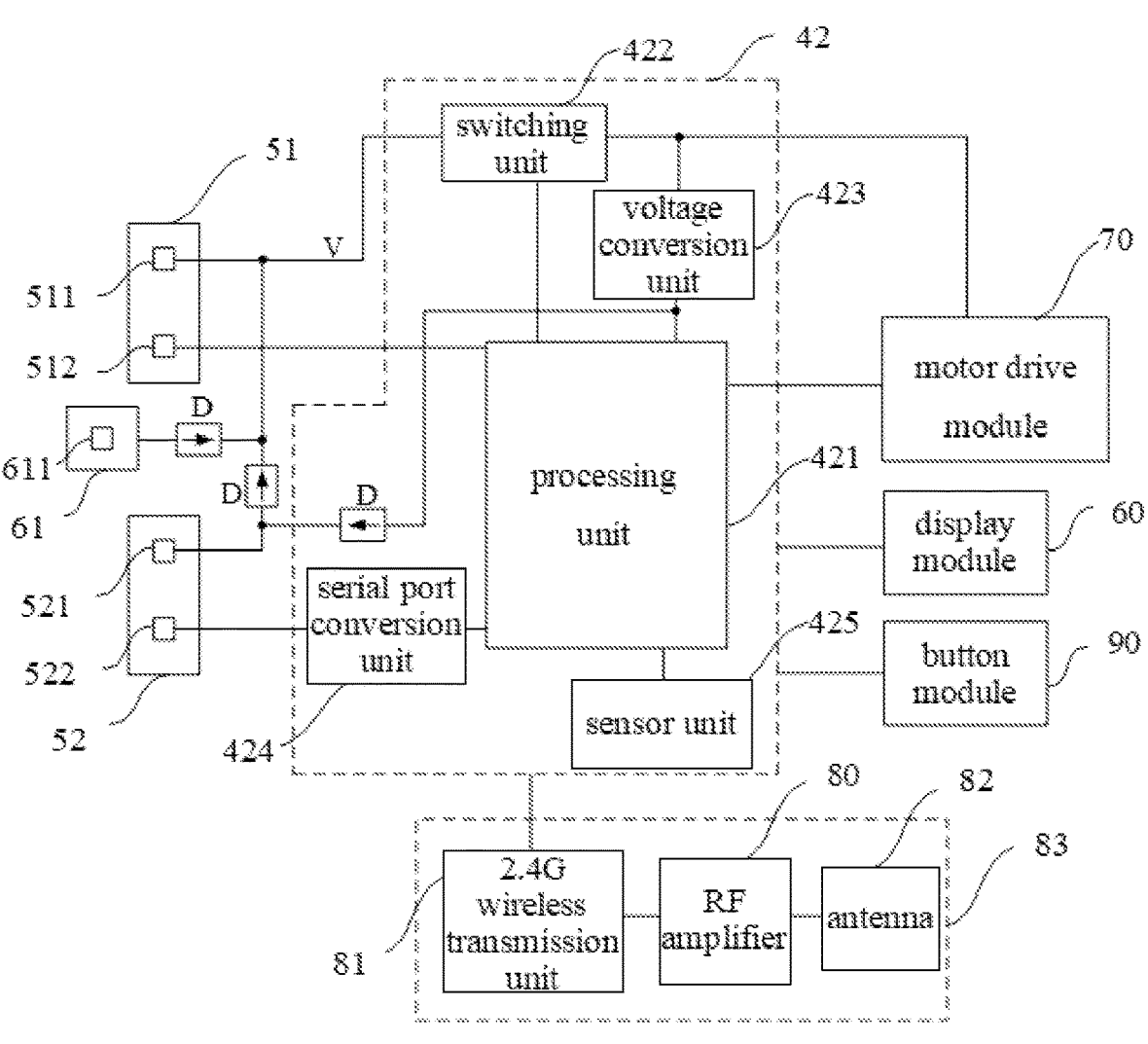
FIG. 16 is a schematic block diagram of the lens driver circuit according to a fourth embodiment of the present disclosure.

Referring to FIG. 16, in this embodiment, the main control circuit 42 includes a processing unit 421, a voltage conversion unit 423, and a switching unit 422.

The processing unit 421 is electrically connected to the first data signal terminal 512, the second data signal terminal 522, and the motor drive module 70 respectively. The processing unit 421 is configured to receive the data signal or the control signal input from the first data signal terminal 512 of the first signal interface 51 and the second data signal terminal 522 of the second signal interface 52, and send out the data signal or the control signal through the first data signal terminal 512 of the first signal interface 51 and the second data signal terminal 522 of the second signal interface 52. The processing unit 421 controls the motor drive module 70 to turn on or turn off.

The switching unit 422 includes an input terminal connected to the power input terminal V, an output terminal connected to the voltage conversion unit 423, and a switching control terminal electrically connected to the processing unit 421. The output terminal of the switching unit 422 is also electrically connected to the motor drive module 70. The processing unit 421 controls the switching unit 422 to conduct or disconnect, thereby turning on or turning off the lens driver. When the switching unit 422 conducts, the output terminal of the switching unit 422 outputs voltage, which is supplied to the voltage conversion unit 423 and to the motor drive module 70.

The voltage conversion unit 423 is electrically connected to the processing unit 421 and is configured to convert the voltage from the output terminal of the switching unit 422 into a suitable voltage to power the processing unit 421 and other power consuming modules (such as the wireless transmission module 80, the display module 60, and the button module 90).

The switching unit 422 may be a switch chip, a switch circuit, or a switch device (such as a switch transistor) that can conduct or disconnect.

In some embodiments, the voltage conversion unit 423 is electrically connected to the second power terminal 521 through the unidirectional conductive unit D, so that the second signal interface 52 may provide voltage to the external device through the second power terminal 521. The voltage is the voltage output by the voltage conversion unit 423, which is relatively small and stable, and will not damage the external device connected to the second signal interface 52.

The voltage conversion unit 423 includes a DC/DC conversion sub-unit (not shown in the drawings) and at least one Low Dropout Regulator (LDO) conversion sub-unit (not shown in the drawings). An end of the DC/DC conversion sub-unit is electrically connected to the output terminal of the switching unit 422, and another end of the DC/DC conversion sub-unit is electrically connected to input terminal of each LDO conversion sub-unit. The processing unit 421 is connected to an output terminal of one of the LDO conversion sub-units to be powered by the LDO conversion sub-unit. The output terminals of the other LDO conversion sub-units are configured to electrically connect to other modules (such as the wireless transmission module 80, the display module 60, and the button module 90) to provide power to these modules.

In some embodiments, the main control circuit 42 further includes a serial port conversion unit 424. The second data signal terminal 522 is connected to the processing unit 421 through the serial port conversion unit 424. In this embodiment, both the first signal interface 51 and the second signal interface 52 may be the interfaces with serial signal transmission function (such as type-c interface). Each of the first data signal terminal 512 and the second data signal terminal 522 includes transmit pins and receive pins.

In some embodiments, the main control circuit 42 further includes a sensor unit 425 electrically connected to the processing unit 421. The sensor unit 425 is configured to detect the rotation of the motor 21. Based on the rotation of the motor 21 detected by the sensor unit 425, the main control circuit 42 controls the time length of turning on and turning off of the motor 21 to achieve precise lens adjustment. The sensor unit 425 may be a magnetic induction sensor or other types of sensors.

In some embodiments, the main control circuit 42 further includes a protection circuit (not shown in the drawings). The power input terminal V is connected to an input terminal of the switching unit 422 through the protection circuit to ensure a stable and reliable voltage input from the power input terminal V.

The present disclosure further provides a lens driver, which includes the motor 21 for adjusting the lens and the lens driver circuit described above. The specific structure of the lens driver circuit refers to the above embodiments. The lens driver circuit is electrically connected to the motor 21. Since the lens driver of the photographic device adopts all the technical solutions of the above embodiments of the lens driver circuit, it possesses all the beneficial effects brought by the technical solutions of the above embodiments, and therefore, they are not repeated here one by one.

In the case without contradicting each other, those skilled in the art can combine the different embodiments or examples described in this specification, as well as the features of different embodiments or examples.

The above description is only a part or preferred embodiments of the present disclosure. Whether in words or in the drawings, it should not limit the scope of protection of the present disclosure. Any equivalent structural changes made by utilizing the contents of the present disclosure specification and drawings or directly/indirectly applying them in other relevant technical fields, under the overall concept of the present disclosure, are included in the scope of protection of the present disclosure.

What is claimed is:

1. A lens driver, applied to a photographic device, the photographic device comprising a focal ring, wherein the lens driver comprises:
    a first housing;
    a driving assembly arranged on the first housing and configured to adjust the focal ring; and
    a mounting member arranged on the first housing and configured to install a battery, the battery being electrically connected to the driving assembly through the mounting member;
    wherein the mounting member is detachably connected to the first housing; and
    one of the mounting member and the first housing is defined with a slot, and the other one is provided with a block; and the mounting member is connected to the first housing by way of inserting the block into the slot.

2. The lens driver of claim 1, further comprising:
    a first conductive assembly arranged on the mounting member and configured to electrically connect to the battery; and
    a second conductive assembly arranged on a side of the first housing connected to the mounting member, the second conductive assembly being electrically connected to the first conductive assembly and the driving assembly respectively.

3. The lens driver of claim 2, wherein the mounting member is defined with a first accommodating cavity for installing the battery, and the first conductive assembly comprises:
    a first conductive member arranged in the first accommodating cavity and configured to electrically connect to the battery; and
    a second conductive member arranged on a side of the mounting member away from the first accommodating cavity, the second conductive member being electrically connected to the first conductive member and the second conductive assembly respectively.

4. The lens driver of claim 3, wherein the first conductive assembly further comprises a circuit board, and both the first conductive member and the second conductive member are electrically connected to the circuit board.

5. The lens driver of claim 4, wherein the mounting member comprises:
    a second housing, a side of the second housing being depressed to form the first accommodating cavity, another side of the second housing being depressed to form a second accommodating cavity, and the circuit board being arranged in the second accommodating cavity; and
    a cover, covering the second accommodating cavity.

6. The lens driver of claim 5, wherein the second housing is defined with a first through-hole communicating the first accommodating cavity and the second accommodating cavity, the first conductive member passes through the first through-hole, an end of the first conductive member is electrically connected to the circuit board, and the other end of the first conductive member is arranged in the first accommodating cavity.

7. The lens driver of claim 6, wherein the cover is defined with a second through-hole, the second conductive member passes through the second through-hole, an end of the second conductive member is electrically connected to the circuit board, and the other end of the second conductive member extends out of the second through-hole or is flush with the second through-hole.

8. The lens driver of claim 1, further comprising a locking assembly, wherein the locking assembly is arranged on the mounting member and/or the first housing to fix the mounting member to the first housing.

9. The lens driver of claim 8, wherein the slot is defined in the mounting member and the block is arranged on the first housing, and the locking assembly comprises:
    a pushing rod, slidably arranged within the mounting member;
    a pushing portion, located on an outside of the mounting member and connected to an end of the pushing rod;
    a hooking portion, located within the slot and connected to another end of the pushing rod; and
    an elastic reset member, an end of the elastic reset member abuts the pushing portion, and the other end of the elastic reset member abuts an inner wall of the mounting member.

10. The lens driver of claim 1, wherein the driving assembly comprises:
    a motor, located within the first housing; and
    a transmission assembly, connected to the motor;
    wherein the motor drives the transmission assembly to adjust the focal ring.

11. The lens driver of claim 10, wherein the transmission assembly comprises a first gear and a second gear, the first gear is mounted on an output shaft of the motor, and the second gear engages with the first gear to adjust the focal ring;

or, the lens driver further comprises a control circuit board, the first housing is provided with an interface and/or a display assembly, and the interface and/or the display assembly is electrically connected to the control circuit board; the interface is configured for charging and/or communication, and the display assembly is configured to display related information of the lens driver.

12. The lens driver of claim 10, further comprising a lens controller, the lens controller is communicatively connected to the driving assembly, and the lens controller is configured to control the motor to rotate.

13. A lens driver circuit, comprising:

a motor drive module configured to drive a motor to rotate;

a main control circuit comprising a power input terminal, the main control circuit being electrically connected to the motor drive module and configured to control the motor drive module to turn on or turn off;

a first signal interface comprising a first power terminal, the first power terminal being electrically connected to the power input terminal; and a second signal interface comprising a second power terminal, the second power terminal being electrically connected to the first power terminal;

wherein the first signal interface further comprises a first data signal terminal, and the first data signal terminal is electrically connected to the main control circuit;

the second signal interface further comprises a second data signal terminal, and the second data signal terminal is electrically connected to the main control circuit;

the main control circuit comprises a processing unit, a voltage conversion unit, and a switching unit, the processing unit is electrically connected to the first data signal terminal, the second data signal terminal, and the motor drive module respectively;

the switching unit comprises an input terminal connected to the power input terminal, an output terminal connected to the voltage conversion unit, and a switching control terminal electrically connected to the processing unit, and the output terminal of the switching unit is electrically connected to the motor drive module; and the voltage conversion unit is electrically connected to the processing unit, and is configured to convert a voltage from the output terminal of the switching unit into a corresponding voltage to power the processing unit.

14. The lens driver circuit of claim 13, further comprising a third signal interface, wherein the third signal interface comprises a third power terminal electrically connected to the first power terminal.

15. The lens driver circuit of claim 14, wherein the second power terminal is unidirectionally conductive to the first power terminal, and the third power terminal is unidirectionally conductive to the first power terminal.

16. The lens driver circuit of claim 13, further comprising a wireless transmission module, the main control circuit being electrically connected to the wireless transmission module to communicate with an external device through the wireless transmission module;

and/or, further comprising a display module and a button module for adjusting, both the display module and the button module are electrically connected to the main control circuit.

17. The lens driver circuit of claim 13, wherein the voltage conversion unit is electrically connected to the second power terminal through a unidirectional conductive unit; and/or, the voltage conversion unit comprises a DC/DC conversion sub-unit and at least one low dropout regulator conversion sub-unit, an end of the DC/DC conversion sub-unit is electrically connected to the output terminal of the switching unit, another end of the DC/DC conversion sub-unit is electrically connected to input terminal of each low dropout regulator conversion sub-unit, and the processing unit is connected to an output terminal of one of the low dropout regulator conversion sub-units.

18. The lens driver circuit of claim 13, wherein the main control circuit further comprises a serial port conversion unit, and the second data signal terminal is connected to the processing unit through the serial port conversion unit;

and/or, the main control circuit further comprises a sensor unit electrically connected to the processing unit, and the sensor unit is configured to detect the rotation of the motor.

19. A lens driver, comprising a motor for adjusting a lens and a lens driver circuit, wherein the lens driver circuit is electrically connected to the motor, the lens driver circuit comprises:

a motor drive module configured to drive the motor to rotate;

a main control circuit comprising a power input terminal, the main control circuit being electrically connected to the motor drive module and configured to control the motor drive module to turn on or turn off;

a first signal interface comprising a first power terminal, the first power terminal being electrically connected to the power input terminal; and a second signal interface comprising a second power terminal, the second power terminal being electrically connected to the first power terminal;

wherein the first signal interface further comprises a first data signal terminal, and the first data signal terminal is electrically connected to the main control circuit;

the second signal interface further comprises a second data signal terminal, and the second data signal terminal is electrically connected to the main control circuit;

the main control circuit comprises a processing unit, a voltage conversion unit, and a switching unit, the processing unit is electrically connected to the first data signal terminal, the second data signal terminal, and the motor drive module respectively;

the switching unit comprises an input terminal connected to the power input terminal, an output terminal connected to the voltage conversion unit, and a switching control terminal electrically connected to the processing unit, and the output terminal of the switching unit is electrically connected to the motor drive module; and the voltage conversion unit is electrically connected to the processing unit, and is configured to convert a voltage from the output terminal of the switching unit into a corresponding voltage to power the processing unit.

* * * * *